United States Patent [19] [11] 3,910,838
Kaelin [45] Oct. 7, 1975

[54] METHOD AND APPARATUS FOR THE PURIFICATION OF AQUEOUS EFFLUENT

[76] Inventor: Joseph Richard Kaelin, Villa Seeburg, CH-6374 Buochs, Switzerland

[22] Filed: June 29, 1973

[21] Appl. No.: 374,959

[30] Foreign Application Priority Data
July 2, 1972 Switzerland.................. 9909/72

[52] U.S. Cl.................. 210/7; 210/14; 210/15; 210/195; 210/197; 210/205; 261/77; 261/91; 261/123
[51] Int. Cl.² ........................ C02C 1/08
[58] Field of Search............... 210/3-5, 15, 210/195, 219, 220, 221, 205, 207, 208, 13, 14, 197; 261/91, 125, 77, 123; 259/4, 18, 36

[56] References Cited
UNITED STATES PATENTS

| | | | |
|---|---|---|---|
| 1,594,947 | 8/1926 | Hartman et al. | 261/125 |
| 2,079,574 | 5/1937 | Lea | 261/91 |
| 3,235,233 | 2/1966 | Bolton | 261/91 |
| 3,271,304 | 9/1966 | Valdespino | 210/13 |
| 3,439,807 | 4/1969 | Danjes | 210/220 |
| 3,547,811 | 12/1970 | McWhirter | 210/15 |
| 3,591,492 | 7/1971 | Neuspiel | 210/15 |
| 3,724,667 | 4/1973 | McKinney | 261/91 |
| 3,765,656 | 10/1973 | Tofaute | 261/91 |

Primary Examiner—Samih N. Zaharna
Assistant Examiner—Peter A. Hruskoci
Attorney, Agent, or Firm—Oblon, Fisher, Spivak, McClelland & Maier

[57] ABSTRACT

A method and apparatus for purifying aqueous effluent in which effluent is passed into a mixing tank to be oxygenated with pure oxygen or an oxygen mixture, e.g., air. The oxygenation can be effected by use of a rotary surface aerator or by passing the effluent along a sinuous flow path and contacting effluent in the flow path with the oxygen.

The oxygenated effluent is then passed from the mixing tank into a residence tank. Part of the oxygenated effluent is returned from the residence tank to the mixing tank, the remainder of the effluent being discharged from the residence tank so as to produce a higher concentration of substances to be decomposed in the mixing tank than in the residence tank. Activated sludge from a further tank may be fed to the mixing tank.

If desired, the treated effluent discharged from the residence tank may be passed to a second mixing tank for further oxygenation and from thence, to a second residence tank.

32 Claims, 6 Drawing Figures

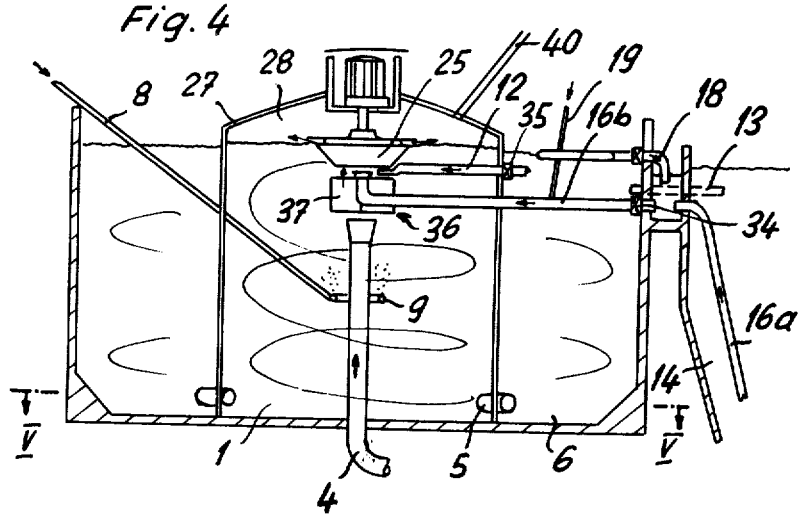
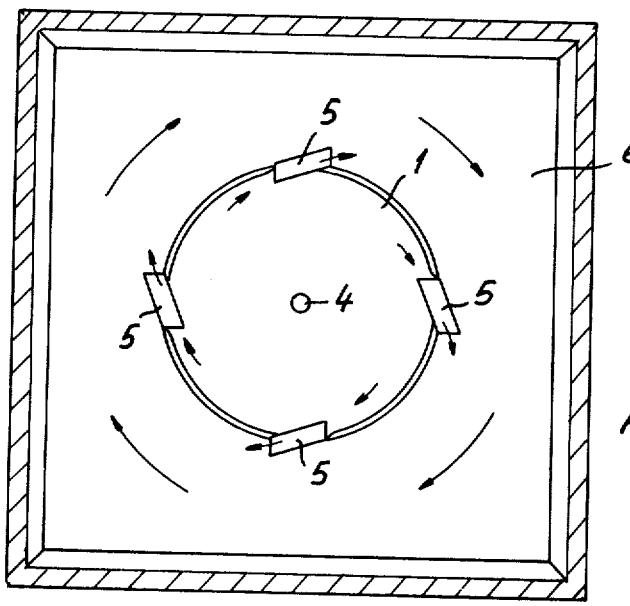

METHOD AND APPARATUS FOR THE PURIFICATION OF AQUEOUS EFFLUENT

The invention relates to a method for purifying aqueous effluent and to an apparatus for carrying out this method.

It is already known to aerate effluent in an activating tank by means of rotary surface aerators; there is, however, a disadvantage that the concentration of sludge which is to be decomposed biologically, and thus the oxygen intake per cubic metre of the effluent, is relatively low.

An object of the present invention is to provide a method in which a higher concentration of biologically decomposable substances and thus a greater oxygen absorption capacity per cubic metre of effluent is achieved.

According to the present invention, there is provided, a method for purifying aqueous effluent comprising the steps of treating effluent to be treated with pure oxygen or an oxygen mixture in at least one mixing tank so as to react with one another, introducing the oxygenated effluent into a residence tank, feeding part of the oxygenated effluent from the residence tank back into the mixing tank in order to regulate the concentration in the mixing tank of substances in the effluent which are to be biologically decomposed, and removing the remaining part of the treated effluent from the residence tank so that there is a higher concentration in the mixing tank of substances to be biologically decomposed than in the residence tank.

In order to introduce pure oxygen or an oxygen mixture into the effluent which is to be purified, without using a rotary aerator, it is convenient to provide the said at least one mixing tank with a closed top and to position the top below the level of effluent in the residence tank, said mixing tank being provided with means to extend the flow path of the effluent in the mixing tank.

It is an advantage if pure oxygen or an oxygen mixture is added to the effluent to be treated before the latter passes into the mixing tank.

It is a further advantage if activated sludge from a second settling tank is introduced into the mixing tank and/or residence tank and mixed with the effluent to be treated. For this, it is advantageous to add pure oxygen or an oxygen mixture to the activated sludge before it passes into the mixing tank or the residence tank, respectively.

For the delivery of the activated sludge, it is advantageous if it is fed out of the re-settling tank and into a storage tank or container in accordance with the principle of communicating pipes, and from there is passed into the mixing and/or residence tank, controlled by means of additional delivery means.

In order to avoid unwanted sludge deposits, it is convenient if the aqueous effluent, which is mixed with oxygen in the mixing tank, is fed into the residence tank in such a way that a flow is obtained on the floor of said tank which is sufficient to prevent the sludge from settling on said floor. At the same time, it is also advantageous if a flow is produced in the effluent, to which oxygen is to be added, in the floor area of the mixing tank, this flow being sufficiently strong to prevent sludge from settling on the floor.

The mixing tank may be provided with a rotary aerator to promote reaction of the effluent with the pure oxygen or oxygen mixture.

If the effluent is very strongly contaminated, it may be necessary to repeat the biological decomposition process several times, by feeding the effluent passing out of the residence tank into a subsequent second mixing tank and then adding pure oxygen or an oxygen mixture to the effluent in this second mixing tank; the effluent, thus mixed with oxygen can then be fed into a second residence tank and from there part of the oxygenated effluent can be passed into the second mixing tank in order to regulate the concentration of substances to be biologically decomposed, present in the second mixing tank, and the remaining part of the oxygenated effluent led off so that there is a higher concentration of substances to be biologically decomposed in the second mixing tank than in the second residence tank.

Also according to the present invention, there is provided an apparatus for performing the method of the present invention, said apparatus comprising at least one mixing tank with means for prolonging the mixing stage inside the mixing tank, at least one conduit for delivering the effluent to be treated to the mixing tank, means for transporting the oxygenated effluent, from the mixing tank to the residence tank, a return conduit extending from the residence tank to the mixing tank for feeding part of the effluent delivered to the residence tank back into the mixing tank, and an effluent outlet for removing effluent from the residence tank.

In order to keep the structural volume as small as possible, it is convenient if the mixing tank is located inside the residence tank.

In order to add as much oxygen as possible to the effluent which is to be treated, i.e., to achieve a large distance over which mixing can occur, it is advantageous if the mixing tank is provided with means to produce an extended or sinuous flow path in said tank. For this, it is convenient if the mixing tank is cylindrical and the means comprise concentrically arranged, tubular partitions. The mixing tank may be sealed so that its top is gas-impervious, provided with at least one pipe for delivering pure oxygen or an oxygen mixture into said tank, and if the top of the mixing tank is located below the level of the effluent in the residence tank.

Alternatively, the mixing tank may be provided with a rotary aerator located therein for promoting mixing of pure oxygen or oxygen mixture with the effluent to be treated and for extending the mixing stage in said effluent.

In order to reduce the noise from the drive motor of the rotary aerator, to prevent climatic influences on the surface of the rotary aerator and, if pure oxygen is used, to avoid leakage of said oxygen, it is advantageous if the top of the aerating tank is hermetically sealed, and if said tank is provided with at least one delivery pipe for the delivery of pure oxygen or oxygen mixture and with at least one outlet pipe for the removal of the gas mixture which is formed during the biological decomposition of the activated sludge.

It is also convenient for the apparatus to include at least one pipe connected to a re-settling tank, for delivering activated sludge to the mixing tank. Also, advantageously, a storage container or tank for receiving activated sludge may be joined by means of at least one pipe to the part of the re-settling tank containing the activated sludge and delivery means may be provided in order to convey the activated sludge out of the storage container or tank and into the mixing tank, in a controlled manner.

Embodiments of the present invention will now be described by way of example, with reference to the accompanying drawings, in which:

FIG. 4 is a vertical section through a second embodiment of apparatus according to the present invention;

FIG. 5 is a horizontal section on line V—V in FIG. 4; and

Figures 1, 2:
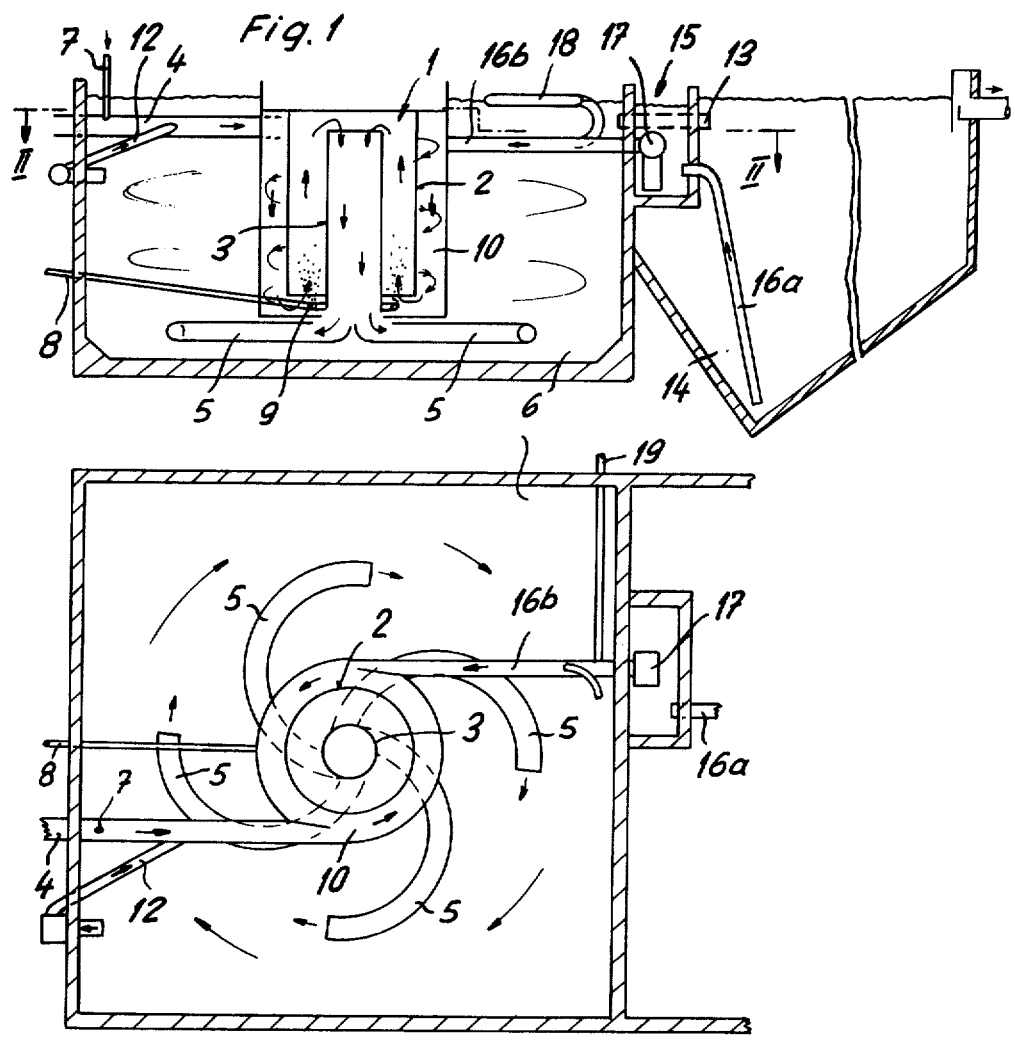
FIG. 1 is a vertical section through a first embodiment of apparatus for the purification of aqueous effluent in accordance with the present invention.
FIG. 2 is a horizontal section on line II—II in FIG. 1.

Referring to FIGS. 1 and 2, the apparatus for purifying aqueous effluent comprises a cylindrical mixing tank 1 provided internally with tubular, concentric partitions 2 and 3 which define a sinuous flow path in the mixing tank. The apparatus further includes a pipe 4 for delivering the effluent to be treated to the mixing tank 1, and outlet pipes 5, connected to the inside of said tank, for transporting the effluent, enriched with oxygen, out of the mixing tank 1 and into a residence tank 6.

In order to feed pure oxygen or an oxygen mixture, for example air, into the effluent which is to be treated, there are provided a first gas delivery pipe 7 which discharges into the delivery pipe 4, and a second gas delivery pipe 8 which extends into the inside of the mixing tank 1 and which terminates in an annular tube 9 provided with outlet orifices.

The mixing stage for mixing, in this embodiment, pure oxygen is very effective because of the provision of the sinuous flow path in the mixing tank. Since the effluent is delivered at high speed tangentially into the mixing tank 1 through the delivery pipe 4 and an outlet nozzle attached to said pipe, it flows with a strong swirling action through an annular space 10, formed between the outer wall of the mixing tank 1 and the partition 2, in a downward direction and from there it is returned upwards into an annular space 11 formed between the partitions 2 and 3.

Since the flow of effluent flowing downwards in the annular space 10 has a strong swirling motion, there is produced an additional, considerable increase in the distance over which the oxygen passed into the delivery pipe 4 can be absorbed by the effluent. In addition, this rotary flow prevents sludge from settling on the floor of the mixing tank 1. It is of course, also possible to arrange partitions or baffles in the annular space 10 in order to increase the swirl of the downwardly flowing stream of effluent.

The apparatus also comprises an adjustable return pipe 12 which extends tangentially from the residence tank 6 into the mixing tank 1, said return pipe 12 serving to lead part of the effluent which has been fed to the residence tank 6 and which has been biologically decomposed, back into the mixing tank 1 in order to regulate the concentration in said tank 1 of substances which are to be decomposed biologically. An outlet pipe 13 for leading off the treated effluent into a re-settling tank 14 is also provided, said pipe 13 opening into the residence tank 6.

The capacity of the mixing tank 1 is less than that of the residence tank 6 and an amount of treated and biologically decomposed effluent is delivered to the mixing tank 1 through the return pipe 12, such that there is a considerably higher concentration of substances which have not yet been biologically decomposed in the mixing tank 1 than in the residence tank 6.

The mixing tank 1, which is sealed on its top so that it is gas-tight, is arranged in the residence tank 6 in such a way that the top of the mixing tank is disposed below the liquid level, which varies, in the residence tank 6; this is in order to prevent a gas space from forming in the upper part of the tank 1 due to the oxygen which is introduced.

The apparatus also comprises a storage tank 15 for holding activated sludge, said tank 15 being in communication with that part of the re-settling tank 14 which contains activated sludge by means of a syphon pipe 16a. A pump 17, in communication with a pipe 16b, pumps the activated sludge present in the storage container 15 in a tangential direction into the inside of the mixing tank 1, in a controlled manner. As the pump 17 pumps activated sludge out of the storage container 15, the level of the sludge in said container 15 drops and there is immediately a compensation of the level through the pipe 16a by activated sludge flowing out of the re-settling tank 14.

In order to remove floating or suspended particles, a skimming device 18 for skimming the surface of the effluent is disposed in the residence tank 6; this device 18 can be regulated and its outlet is in communication with the pipe 16b for delivering activated sludge from the re-settling tank 14 to the mixing tank 1.

In order to add oxygen to the activated sludge coming from the re-settling tank 14 in the most efficient way possible, it is advantageous if pure oxygen or an oxygen mixture is introduced through a delivery pipe 19 into the pipe 16b so that an intensive mixing and absorption of oxygen by the activated sludge takes place in this pipe 16b.

With the apparatus illustrated in FIGS. 1 and 2 it is possible to achieve a high decomposition performance of 94 to 98% $BSB_5$.

Figure 3:
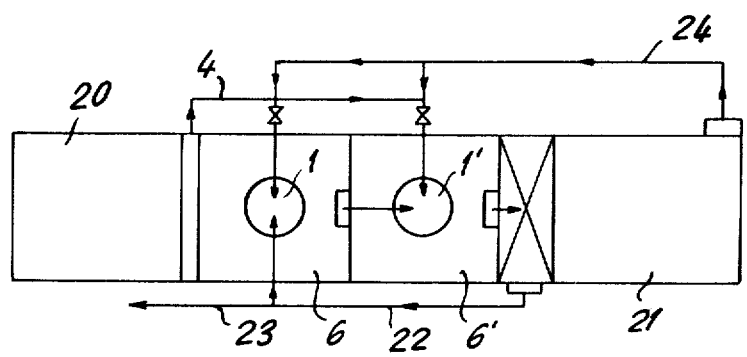
FIG. 3 is a diagrammatic cross-section of a complete settling plant including two apparatuses as in FIGS. 1 and 2.

With aqueous effluent which is particularly difficult to purify, it is convenient to connect two of the apparatuses shown in FIGS. 1 and 2 in series, as illustrated in FIG. 3. With the plant shown in FIG. 3, the effluent passes out of a pre-settling tank 20 through delivery pipe 4 to enter mixing tanks 1 and 1'. The effluent in the first residence tank 6 which has already been processed is then delivered to the second mixing tank 1' to be treated again and it is mixed in said tank 1' with freshly delivered effluent which is to be processed. The treated effluent flows out of the second residence tank 6' into a re-settling tank 21 where re-settling takes place.

Some of the sludge which passes out of the re-settling tank 21 is returned to the first mixing tank 1 through the delivery pipe 22. The rest of the sludge from the re-settling tank is led off as excess sludge through the pipe 23. In addition, part of the water from the re-settling tank is also returned to the mixing tanks 1 and 1' through the pipe 24.

Figure 6:
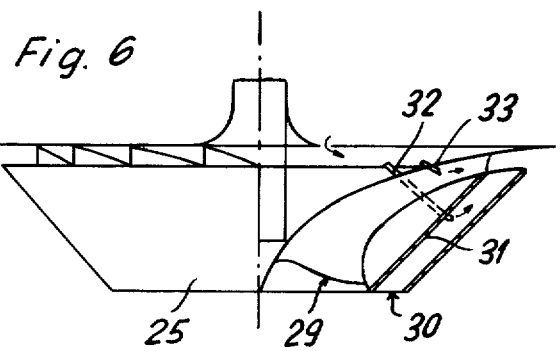
FIG. 6 is a side view, partially in section and on an enlarged scale of a rotary surface aerator shown in FIG. 4.

Referring now to FIGS. 4 to 6, the apparatus means for purifying aqueous effluent comprises a rotary surface aerator 25, disposed in mixing tank 1, said aerator 25 serving to introduce pure oxygen or an oxygen mixture into the effluent which is to be treated, delivery pipe 4 for delivering the effluent to the mixing tank 1 and outlet pipes 5, located in the bottom part of mixing tank 1, for transporting the effluent, enriched with oxygen, out of the mixing tank 1 into residence tank 6. Return pipe 12, which can be regulated, extends from the residence tank 6 into the mixing tank 1, for conducting part of the aerated effluent delivered to the residence tank 6 back to the tank 1 in order for the concentration of particles to be decomposed biologically, present in said effluent, to be regulated. Outlet pipe 13, opens into the residence tank 6 and serves to feed the treated effluent into re-settling tank 14.

The capacity of the tank 1 is selected so that it is smaller than that of the residence tank 6, and the amount of treated effluent which is delivered to the tank 1 through the return pipe 12 is such that there is a considerably higher concentration of particles which have not yet been biologically decomposed in the tank 1 than in the residence tank 6.

The delivery pipe 4, which supplies the aqueous effluent to be treated to the tank 1, extends into the intake area of the rotary surface aerator 25 so that said aerator exerts a suction action, dependent on the aerator speed, on the outlet of the delivery pipe 4.

Gas delivery pipe 8, which extends into the interior of the tank 1 and which terminates in annular pipe 9 provided with outlet apertures, is provided for the delivery of oxygen or oxygen mixture to the effluent which is to be treated.

Because of the delivery of the effluent to the upper region of the tank 1 and the action of the rotary aerator 25, an upwardly flowing, swirling current is produced in the effluent present in the tank 1 so that rising flow of gas bubbles from the annular pipe 9 is impeded with the result that the gas bubbles are retained for as long as possible in the effluent.

If pure oxygen is supplied through the delivery pipe 8, it is particularly important to ensure that no oxygen is lost at the top through the surface of the water. In order to prevent this from happening, the mixing tank 1 is hermetically sealed at its top by a cover 27. Oxygen can then collect in space 28 between the cover 27 and the surface of the water to be re-introduced into the effluent by means of the rotary surface aerator 25.

The cover 27 is also provided with an outlet pipe 40 to remove the gas mixture which is formed during the biological deoomposition of the sludge.

The outlet pipes 5 in the lower part of the tank 1 are arranged in such a way that a sufficiently strong rotary flow is produced in the floor region of the tank 1 and of the residence tank 6 to prevent sludge from settling on the floor.

The rotary surface aerator 25 has two blade faces 29 and 30, arranged concentrically to one another, as can be seen from FIG. 6, whereby a partition wall 31 is provided between the two adjacent blade faces 29 and 30; the blades serve to increase the mixing action and to enable more oxygen or oxygen mixture to be delivered out of the area 28 into the effluent. Pipes 32 and 33 serve to feed oxygen or oxygen mixture from the area 28 of the tank 1 into individual blade conduits, the fluid flowing through the individual blade conduits effecting a suction action in the pipes 32 and 33 and sucks in the oxygen or oxygen mixture.

The apparatus also comprises pipes 16a and 16b for delivering activated sludge out of re-settling tank 14 to the tank 1, said pipes 16a being provided with a valve 34 for regulating the flow and being connected to the re-settling tank 14. The pipe 16b discharges in the intake region of the inner blade face 29. Return pipe 12, which is equipped with a valve 35 and which serves to return part of the treated effluent to the tank 1 from the residence tank 6, discharges in the intake region of the outer blade face 30.

Mounted immediately below the intake aperture of the rotary aerator 25, a device 36 for guiding the flow is arranged, said device 36 being equipped with vertically extending guide faces 37 for producing a swirl-free flow of liquid into the intake opening of the rotary aerator 25, in order to achieve highest possible efficiency of the rotary aerator 25.

In order to remove floating and suspended particles, skimming device 18 for sucking off the surface water is arranged in the residence tank 6, said device 18 being adjustable and being in communication through its outlet with the pipe 16b which delivers activated sludge from the re-settling tank 14 to the tank 1.

In order to add oxygen to the activated sludge passing out of the re-settling tank 14 in the most efficient way possible, it is advantageous if oxygen or oxygen mixture is conducted through supply line 19 to the pipe 16b so that an intensive mixing action and absorption of oxygen by the activated sludge takes place in said pipe 16b.

With aqueous effluent which is particularly difficult to purify, it is also possible to deliver the aerated effluent present in the residence tank 6 through the outlet pipe 13 of the delivery pipe 4 to an additional aerating device, as illustrated in FIG. 4.

It is, of course, possible to mount the mixing tank next to the residence tank; however it should be ensured that the aerated effluent flowing out of the former and into the latter effects a rotational flow in the floor region of the residence tank, such that the sludge is prevented from settling.

The embodiments of the invention in which an exclusive property or priviledge is claimed are defined as follows:

1. A method for purifying aqueous effluent comprising the steps of:
    conducting said effluent directly into one end of a closed mixing tank which is disposed within a residence tank of larger capacity than said mixing tank;
    supplying oxygen or an oxygen mixture to said effluent as said effluent is conducted into said mixing tank;
    conducting said oxygenated effluent through an extended flow path within said mixing tank so as to facilitate the reaction between said oxygen and said effluent;
    discharging said oxygenated effluent from the other end of said mixing tank and into said residence tank through a plurality of discharge conduits disposed at a position adjacent to the floor of said residence tank and oriented such that a strong rotary flow is produced in the floor region of said residence tank so as to prevent the formation of sludge deposits within said floor region;

re-cycling a portion of said oxygenated effluent disposed within said residence tank back into said mixing tank along with said effluent supply at said one end of said mixing tank; and removing excess oxygenated effluent from said residence tank.

2. A method as claimed in claim 1, wherein pure oxygen or oxygen mixture is introduced into the effluent present in the mixing tank by means of at least one supply pipe.

3. A method as claimed in claim 2, wherein the pure oxygen or the oxygen mixture is introduced into the mixing tank at such a point that the gas-bubbles which arise remain as long as possible in the effluent present in the mixing tank.

4. A method as claimed in claim 1, wherein activated sludge from a re-settling tank is passed into the mixing tank and is mixed in said tank with the effluent to be treated.

5. A method as claimed in claim 4, wherein pure oxygen or oxygen mixture is added to the activated sludge before it enters the mixing tank.

6. A method as claimed in claim 4, wherein the activated sludge is fed out of the re-settling tank into a storage container or tank, and from there it is delivered to the mixing tank, controlled by means of additional conveying means.

7. A method as claimed in claim 1, wherein the effluent is oxygenated in said mixing tank which is arranged centrally in the residence tank.

8. A method as claimed in claim 1, wherein a flow of effluent to be treated is produced in the floor area of the mixing tank which is sufficiently strong to prevent sludge from settling on the floor.

9. A method as claimed in claim 1, wherein the effluent to be treated is oxygenated using a rotary aerator.

10. A method as claimed in claim 9, wherein the pure oxygen or oxygen mixture is introduced into the effluent present in the mixing tank, below an intake opening of the rotary aerator, by means of at least one supply pipe.

11. A method as claimed in claim 9, wherein activated sludge from a re-settling tank is passed into an intake region of the rotary aerator in the mixing tank.

12. A method as claimed in claim 9, wherein the rotary aerator and discharge conduits provided in the floor region of the mixing tank, are arranged to provide a sufficiently strong flow over the floor of the mixing tank to prevent sludge from settling on said floor.

13. A method as claimed in claim 1, including the additional steps of feeding the effluent from the residence tank to a second mixing tank, and mixing pure oxygen or oxygen mixture with the effluent in the second mixing tank, passing the further oxygenated effluent into a second residence tank, returning part of the effluent from the second residence tank to the second mixing tank in order to regulate therein the concentration of particles to be biologically decomposed, and removing remaining effluent from the second residence tank so as to produce a higher concentration of particles to be biologically decomposed in the second mixing tank than in the second residence tank.

14. The method as set forth in claim 1, wherein the top of said mixing tank is disposed below the level of the liquid within said residence tank.

15. Apparatus for purifying aqueous effluent comprising:

a residence tank;

a closed mixing tank disposed within said residence tank, said residence tank having a larger capacity than said mixing tank;

means for supplying said effluent to be treated directly into one end of said mixing tank;

means for supplying oxygen or an oxygen mixture to said effluent as said effluent is conducted into said mixing tank for reacting with and treating said effluent;

means disposed within said mixing tank for extending the effluent flow path within said mixing tank so as to facilitate the reaction between said oxygen and said effluent;

a plurality of means for discharging said oxygenated effluent from the other end of said mixing tank and into said residence tank, said plurality of means being disposed at a position adjacent to the floor of said residence tank and oriented such that a strong rotary flow is produced in the floor region of said residence tank so as to prevent the formation of sludge deposits within said floor region;

means connected with said effluent supply means for recycling a portion of said oxygenated effluent disposed within said residence tank back into said mixing tank at said one end of said mixing tank; and means for removing excess oxygenated effluent from said residence tank.

16. Apparatus as claimed in claim 15, wherein the mixing stage extending means comprises partitions arranged to produce a sinuous flow path inside said tank.

17. Apparatus as claimed in claim 16, wherein the mixing tank is cylindrical in shape and the partitions are of tubular form and are arranged concentrically to one another.

18. Apparatus as claimed in claim 15, wherein the two tanks are co-axially arranged.

19. Apparatus as claimed in claim 15, wherein the mixing tank is hermetically sealed on its top and is provided with at least one delivery line for deliverying pure oxygen or oxygen mixture to the mixing tank, and the top of the mixing tank is disposed, in use, below the level of the liquid in the residence tank.

20. Apparatus as claimed in claim 15, wherein mixing stage extending means comprises a rotary aerator arranged in the mixing tank.

21. Apparatus as claimed in claim 20, wherein said means for delivering the effluent to be treated to the mixing tank extends into an intake region of the rotary surface aerator.

22. Apparatus as claimed in claim 20, wherein the mixing tank is hermetically sealed on its top and is provided with at least one delivery pipe for delivering pure oxygen or oxygen mixture, and with at least one outlet for removing the gas mixture which is formed during biological decomposition of the activated sludge.

23. Apparatus as claimed in claim 20, wherein the rotary surface aerator has at least two rings of blades which are disposed concentrically to each other and in a radial direction in one another, and a partition wall is provided between any two adjacent blade rings.

24. Apparatus as claimed in claim 20, wherein at least one pipe which is in communication with a re-settling tank serves to supply activated sludge to the mixing tank.

25. Apparatus as claimed in claim 24, wherein the pipe for supplying activated sludge to the mixing tank discharges into an intake region of one blade ring, and said recycling means for returning part of the effluent delivered to the residence tank discharges in the intake region of the other blade ring.

26. Apparatus as claimed in claim 25, wherein said pipe for delivering activated sludge and said recycling means are each provided with a flow regulating member.

27. Apparatus as claimed in claim 24, wherein the residence tank is provided with a skimmer device for sucking off the surface water, an outlet of said device being in communication with said pipe for delivering activated sludge to the mixing tank.

28. Apparatus as claimed in claim 24, wherein a storage container or tank for holding activated sludge is connected by means of at least one pipe to a part of the re-settling tank which, in use, contains the activated sludge and conveying means are provided in order to feed activated sludge from the storage container or tank to the mixing tank in a controlled manner.

29. Apparatus as claimed in claim 24, wherein at least one pure oxygen or oxygen mixture supply pipe discharges into the pipe serving to deliver activated sludge to the mixing tank.

30. Apparatus as claimed in claim 20, wherein a device for guiding the flow is arranged immediately below an intake opening of the rotary aerator, said device having vertically extending guide faces for producing a swirl-free flow of liquid entering the intake opening of the rotary aerator.

31. Apparatus as claimed in claim 15, wherein at least two mixing tanks are connected in series, each of which has associated thereto a residence tank, and an effluent outlet of the first residence tank is connected to a delivery conduit of the second mixing tank.

32. Apparatus as claimed in claim 31, wherein the delivery conduit of the second mixing tank is connected to the delivery conduit of the first mixing tank by means of a regulating member.

* * * * *

UNITED STATES PATENT OFFICE
CERTIFICATE OF CORRECTION

Patent No. 3,910,838     Dated October 7, 1975

Inventor(s)  Joseph Richard Kaelin

It is certified that error appears in the above-identified patent and that said Letters Patent are hereby corrected as shown below:

On the cover sheet the illustrative figure and Fig. 1, should appear as shown on the attached sheet.

*Signed and Sealed this*

*twenty-fifth* Day of *May 1976*

[SEAL]

Attest:

RUTH C. MASON
*Attesting Officer*

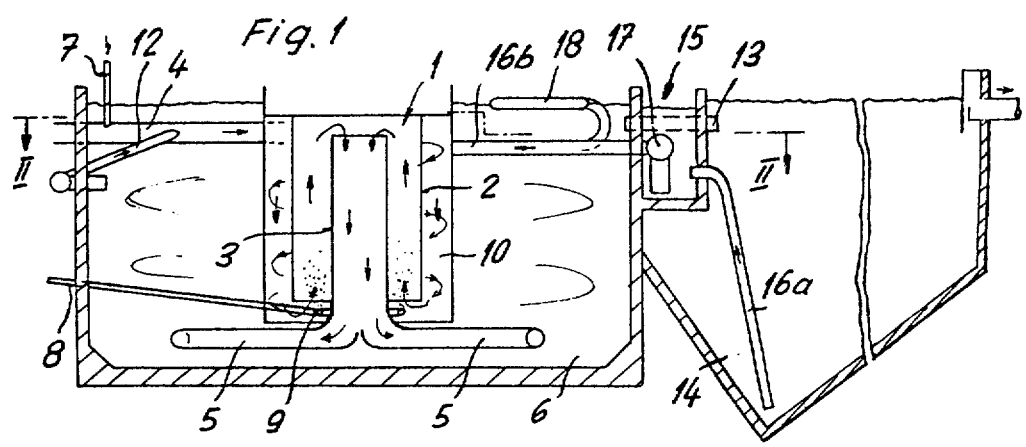

C. MARSHALL DANN
*Commissioner of Patents and Trademarks*